(12) United States Patent
Gibson et al.

(10) Patent No.: US 9,108,613 B2
(45) Date of Patent: Aug. 18, 2015

(54) METHOD AND SYSTEM FOR STOPPING AN ENGINE

(71) Applicant: Ford Global Technologies, LLC, Dearborn, MI (US)

(72) Inventors: Alex O'Connor Gibson, Ann Arbor, MI (US); David Oshinsky, Trenton, MI (US); Seung-Hoon Lee, Northville, MI (US); Jeffrey Allen Doering, Canton, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 13/647,215

(22) Filed: Oct. 8, 2012

(65) Prior Publication Data

US 2014/0100082 A1    Apr. 10, 2014

(51) Int. Cl.
| | |
|---|---|
| *B60W 10/02* | (2006.01) |
| *B60K 6/48* | (2007.10) |
| *B60W 10/06* | (2006.01) |
| *B60W 10/08* | (2006.01) |
| *B60W 30/20* | (2006.01) |
| *B60W 20/00* | (2006.01) |
| *F02N 19/00* | (2010.01) |

(52) U.S. Cl.
CPC .................. *B60W 10/02* (2013.01); *B60K 6/48* (2013.01); *B60W 10/06* (2013.01); *B60W 10/08* (2013.01); *B60W 20/40* (2013.01); *B60W 30/20* (2013.01); *F02N 19/005* (2013.01); *B60K 2006/4825* (2013.01); *B60W 2510/0685* (2013.01); *B60W 2710/0644* (2013.01); *B60Y 2300/48* (2013.01); *B60Y 2400/48* (2013.01); *F02N 2019/008* (2013.01); *Y02T 10/6221* (2013.01); *Y02T 10/6252* (2013.01); *Y02T 10/6286* (2013.01); *Y10T 477/71* (2015.01); *Y10T 477/79* (2015.01)

(58) Field of Classification Search
USPC .................. 477/5, 6, 167, 166, 174, 181, 164
See application file for complete search history.

(56) References Cited

U.S. PATENT DOCUMENTS

| | | | | |
|---|---|---|---|---|
| 6,364,807 | B1 * | 4/2002 | Koneda et al. | 477/5 |
| 6,688,411 | B2 | 2/2004 | Boggs et al. | |
| 7,885,737 | B2 * | 2/2011 | Hirata et al. | 701/22 |
| 7,996,135 | B2 * | 8/2011 | Ishii et al. | 701/54 |
| 8,142,328 | B2 * | 3/2012 | Reuschel | 477/6 |
| 8,192,324 | B2 * | 6/2012 | Kraska et al. | 477/5 |
| 8,882,634 | B2 * | 11/2014 | Banker et al. | 477/5 |
| 8,932,179 | B2 * | 1/2015 | Banker et al. | 477/4 |
| 8,938,327 | B2 * | 1/2015 | Doering et al. | 701/22 |
| 2011/0136620 | A1 * | 6/2011 | Gibson et al. | 477/64 |
| 2012/0029742 | A1 | 2/2012 | Worthing et al. | |

* cited by examiner

*Primary Examiner* — Ramya Burgess
*Assistant Examiner* — David J Hlavka
(74) *Attorney, Agent, or Firm* — David Kelley; Alleman Hall McCoy Russell & Tuttle LLP (57) ABSTRACT

A method and a system for improving operation of a hybrid vehicle are presented. In one example, a disconnect clutch is operated in response to an engine stop request to adjust an engine stopping position during an engine shutdown. The approach may reduce engine starting time after the engine stop.

15 Claims, 6 Drawing Sheets

METHOD AND SYSTEM FOR STOPPING AN ENGINE

FIELD

The present description relates to a system and methods for improving engine stopping so as to provide improved conditions for restarting the engine. The methods may be particularly useful for engines that are selectively coupled to an electrical machine and a transmission.

BACKGROUND AND SUMMARY

An engine of a hybrid vehicle may be repeatedly stopped and restarted during the course of a trip to conserve fuel. Stopping the engine may increase vehicle fuel economy when the vehicle can be propelled by an alternative power source that does not solely rely on a hydrocarbon fuel. However, engine emissions may increase when the engine is restarted and powertrain torque may be limited until the engine reaches operating speed. Therefore, it may be desirable to provide a way to improve engine starting so that engine emissions are reduced and so that engine torque is available shortly after engine starting.

The inventors herein have recognized the above-mentioned issues and have developed a method for stopping an engine, comprising: adjusting a disconnect clutch application force in response to an engine stop request, and further adjusting the disconnect clutch slip to stop the engine at a desired position.

By adjusting operation of a driveline disconnect clutch in response to an engine stop request, it may be possible to position the engine during stopping so that fewer engine emissions are produced during engine starting. Additionally, the engine may be able to reach conditions where engine torque is available to the driveline in a shorter amount of time since the engine was stopped. In one example, a selected cylinder of an engine is stopped at a position a predetermined interval after top-dead-center (TDC) compression stroke of the cylinder and before the cylinder enters an exhaust stroke. Stopping the engine at this location allows spark and fuel to be injected to the cylinder in response to an engine start request so that combustion may be provided in the cylinder before engine rotation or shortly after engine rotation begins. As a result, the engine may reach operating speed sooner and less cylinder contents may be pumped to atmosphere before being combusted.

The present description may provide several advantages. Specifically, the approach may reduce engine starting time. Additionally, the approach may reduce engine emissions by pumping less cylinder contents to atmosphere. Further, engine starting time may be more repeatable.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
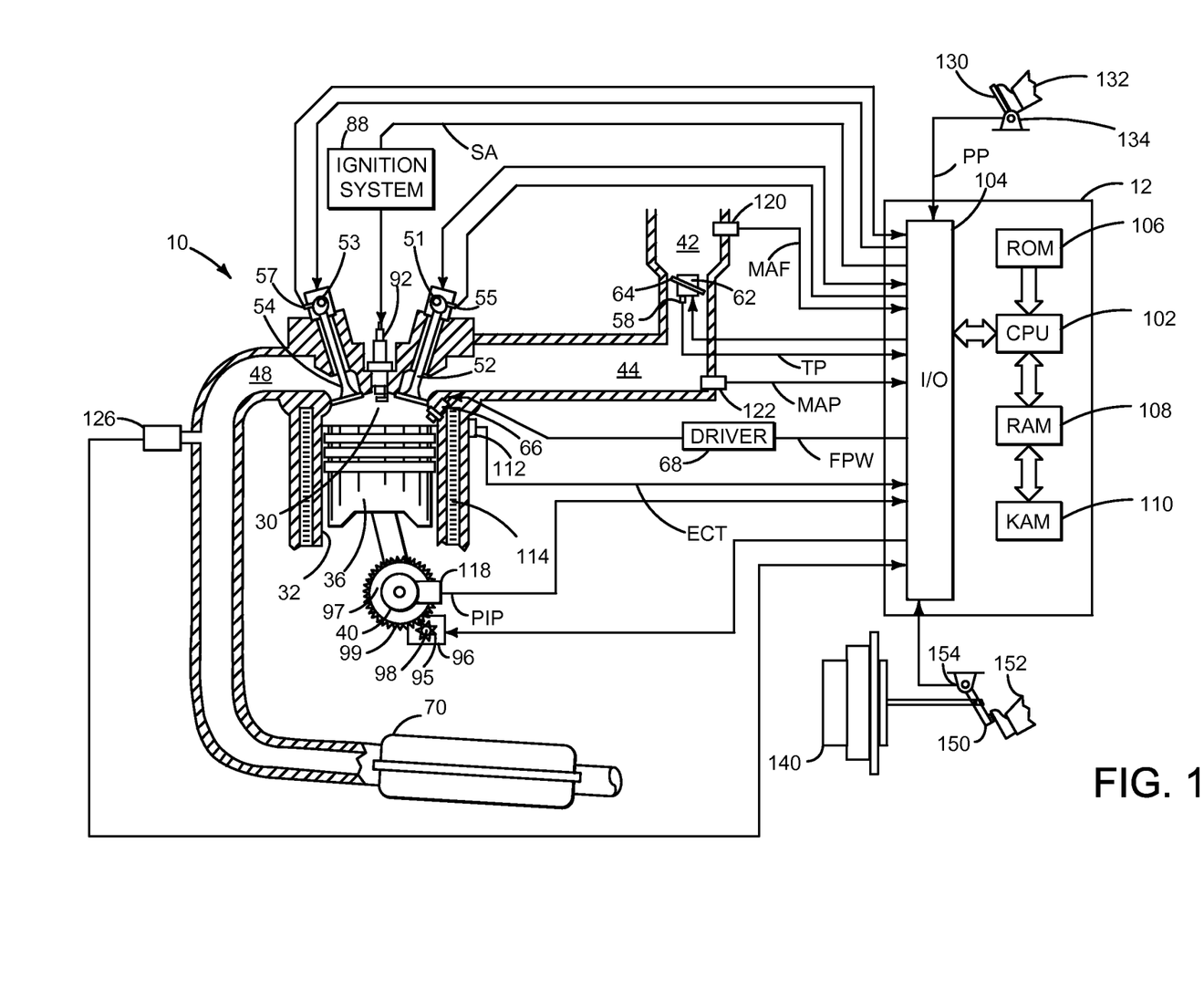
FIG. 1 is a schematic diagram of an engine.
Figure 2:
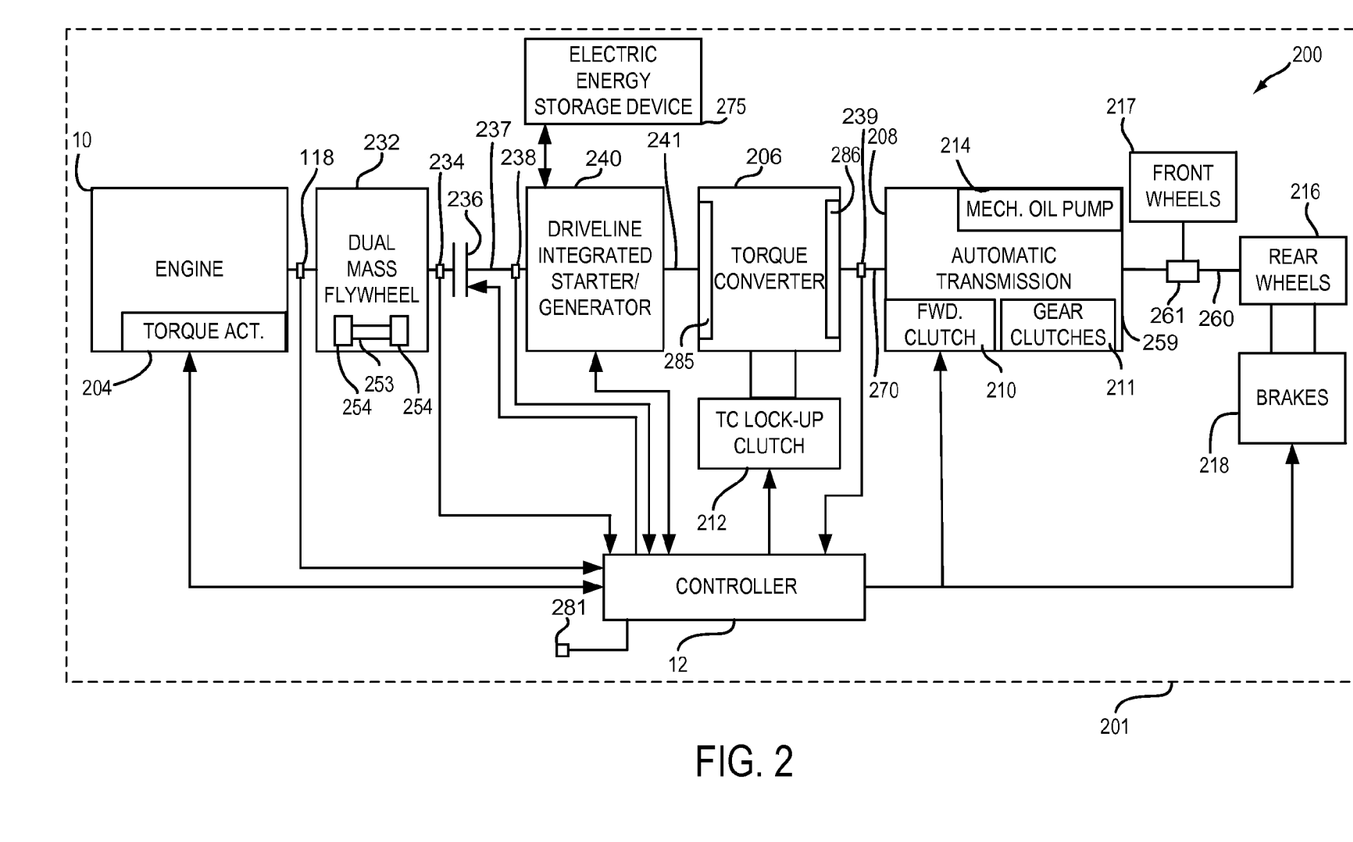
FIG. 2 is shows an example vehicle and vehicle driveline configuration.
Figure 3:
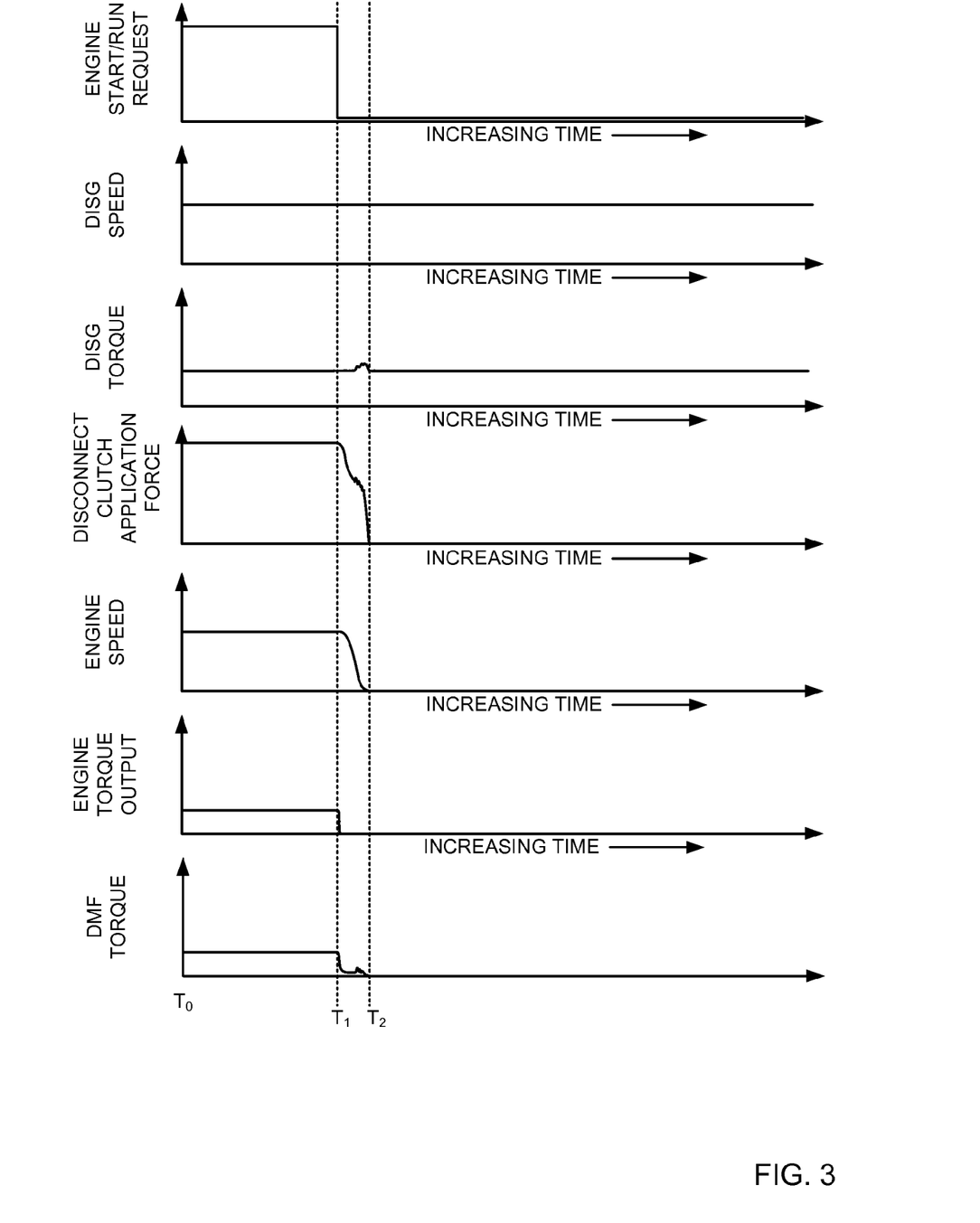
FIG. 3 is shows a first prophetic engine stopping sequence.
Figure 4:
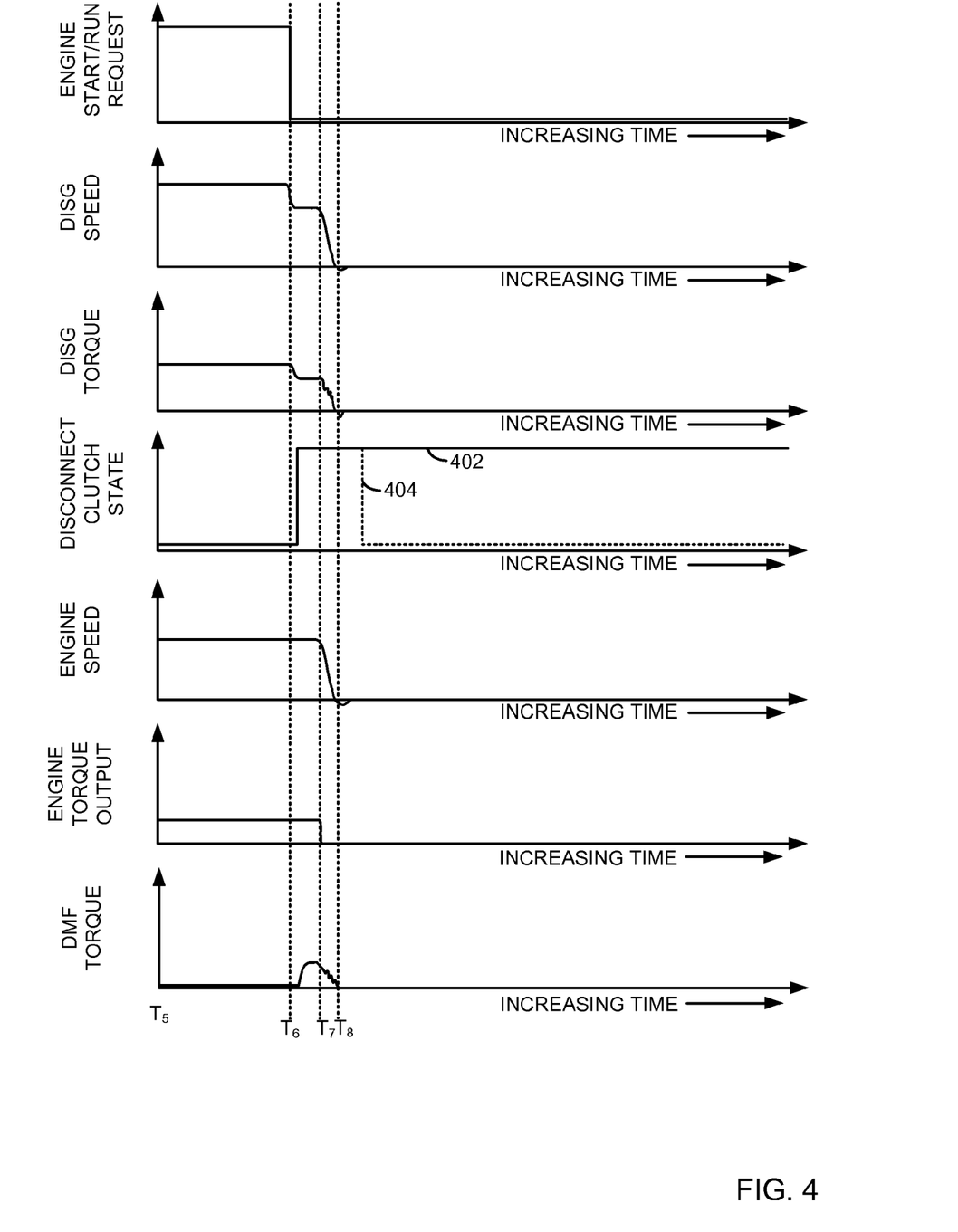
FIG. 4 is shows a second prophetic engine stopping sequence.

The present description is related to controlling a driveline of a hybrid vehicle. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline. The hybrid vehicle's engine may be stopped as shown in FIGS. 3 and 4 according to the method of FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 206 by adjusting the torque converter lock-up clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming cylinder combustion.

Thus, the system of FIGS. 1 and 2 provides for a system for stopping an engine, comprising: an engine; a DISG: a disconnect clutch positioned in a driveline between the engine and the DISG; a dual mass flywheel positioned in the driveline between the engine and the disconnect clutch; and a controller, the controller including non-transitory executable instructions for adjusting an engine stopping position via adjusting a disconnect clutch application force. The system includes where the non-transitory executable instructions for adjusting the disconnect clutch application force include slipping the disconnect clutch after at least one of spark and fuel flow to the engine cease.

In some examples, the system includes where the non-transitory executable instructions for adjusting the disconnect clutch application force include closing the disconnect clutch before at least one of spark and fuel flow to the engine cease. The system further comprises additional non-transitory executable instructions for cancelling driveline torque disturbances of the dual mass flywheel. The system further comprises additional non-transitory executable instructions for reversing a direction of the engine after an engine stop and before an engine start.

Referring now to FIG. 3, an example engine stopping sequence is shown. The example sequence may be performed by the system of FIGS. 1 and 2 according to the method of FIGS. 5 and 6. In this example, a disconnect clutch is opened during an engine stop sequence.

The first plot from the top of the figure shows an engine start/run request signal versus time. The Y axis represents the engine start/run state. A high level indicates that the engine is to be started; however, if the engine is started, the engine is to remain running while the engine start/run request signal is at a higher level. The engine is to be stopped when the engine start/run request signal is at a lower level. The X axis represents time and time increases from the left to the right side of the plot.

The second plot from the top of the figure shows DISG speed versus time. The Y axis represents DISG speed and DISG speed increases in the direction of the Y axis arrow. The X axis represents time and time increases from the left to the right side of the plot.

The third plot from the top of the figure shows DISG torque versus time. The Y axis represents DISG torque and DISG torque increases in the direction of the Y axis arrow. The X axis represents time and time increases from the left to the right side of the plot.

The fourth plot from the top of the figure shows disconnect clutch application force versus time. The Y axis represents disconnect clutch application force and disconnect clutch application force increases in the direction of the Y axis arrow. The disconnect clutch application force is an amount of force applied to close or open the disconnect clutch. A higher disconnect clutch application force reduces slip between clutch plates and allows disconnect clutch input and output shafts or flanges to rotate together. The X axis represents time and time increases from the left to the right side of the plot.

The fifth plot from the top of the figure shows engine speed versus time. The Y axis represents engine speed and engine speed increases in the direction of the Y axis arrow. The X axis represents time and time increases from the left to the right side of the plot.

The sixth plot from the top of the figure shows engine torque versus time. The Y axis represents engine torque and engine torque increases in the direction of the Y axis arrow. The X axis represents time and time increases from the left to the right side of the plot.

The seventh plot from the top of the figure shows DMF torque versus time. The Y axis represents DMF torque and DMF torque increases in the direction of the Y axis arrow. The DMF torque is an amount of torque transmitted through the DMF. The X axis represents time and time increases from the left to the right side of the plot.

At time $T_0$, the engine is running as indicated by the engine start/run request being at a higher state. The engine and DISG are operating at the same speed and the disconnect clutch is closed so as to mechanically couple the engine and the DISG. A relatively high force is applied to the disconnect clutch to keep the DISG coupled to the engine. The DISG and engine are both outputting a medium level of torque to the vehicle driveline. The DMF is transferring the engine torque to the driveline.

At time $T_1$, the engine start/run request transitions to a lower state in response to a request to stop the engine. The engine start/run request may transition to a lower state in response to a request by a vehicle driver or a controller. Spark and/or fuel flow to the engine is stopped in response to the engine start/run request transitioning to a lower state. As a result, the engine torque output is quickly reduced.

Between time $T_1$ and time $T_2$, force applied to the disconnect clutch is reduced so that the engine may decelerate to stop while the DISG remains rotating. The DISG is shown at a constant level, but DISG speed and torque output may change in response to a change in an amount of torque requested by a driver via the accelerator pedal. As engine speed is reduced, engine speed and engine position are monitored by controller 12.

In one example, the actual engine speed and/or position may be compared to a desired engine speed and/or engine position after the engine start/run request transitions to a lower level indicating a request to stop the engine. If the actual engine speed is lower than desired during engine stopping, the engine speed may be increased via increasing the disconnect clutch application force and increasing the DISG output torque. On the other hand, if the actual engine position is greater than a desired engine position during engine stopping (e.g., actual engine position is ahead of desired engine position), the engine speed may be decreased to adjust actual engine position to the desire engine position via decreasing the disconnect clutch application force. Further, the DISG torque may be estimated or monitored so that oscillations in DISG torque may be compensated via adjusting disconnect clutch slip and/or DISG output torque.

Returning now to FIG. 3, engine speed is shown decelerating in response to a lack of fuel and spark delivery to the engine. At a time a little after half way between time $T_1$ and time $T_2$, the application force applied to the disconnect clutch is shown increasing and decreasing in response to engine speed, engine position, and DMF torque. Increasing the disconnect clutch force increases the engine speed since the DISG is rotating at a higher speed than the engine. In other words, additional torque is transferred from the DISG to the engine via closing the disconnect clutch so that the engine stops later in time at a desired engine position. At nearly the same time, the DISG torque is increased to maintain the DISG speed and to accelerate the engine. The DISG torque and disconnect clutch application force are also adjusted to reduce driveline oscillations that may result for increasing and/or decreasing disconnect clutch application force. The DMF may oscillate when torque is stored or released from springs and masses in the DMF. In one example, when compressed DMF springs release torque to the driveline, the DISG torque is reduced and the disconnect clutch application pressure is decreased so as to increase disconnect clutch slippage. In this way, driveline oscillations may be reduced. Further, if the DMF springs/mass are compressing and storing torque, the DISG torque may be increased to maintain engine speed on a desired trajectory. In this example, the DISG torque and disconnect clutch application force are shown increasing and decreasing in response to engine speed, engine position, and DISG torque.

At time $T_2$, the engine is stopped. The DISG continues to rotate at a constant speed and the disconnect clutch is in an open state as a result of a low disconnect clutch application force. The engine start/run request remains low indicating that the engine is to remain in a stopped state. The DISG torque is shown at a constant value, but as previously mentioned, DISG speed and torque may be adjusted to meet driver demand torque when the engine is stopped and when the disconnect clutch is open. Further, the engine torque and DMF torque are zero. In this way, a disconnect clutch may be used in conjunction with a DISG to control a stopping position of an engine.

Referring now to FIG. 4, another example engine stopping sequence is shown. The example sequence may be performed by the system of FIGS. 1 and 2 according to the method of FIGS. 5 and 6. In this example, a disconnect clutch is closed when the engine is stopped. The plots in FIG. 4 show the same variable as the plots in FIG. 3, excepting the fourth plot from the top of FIG. 4 which is described below. Therefore, for the sake of brevity the description of plots having the same labels is omitted.

The fourth plot from the top of FIG. 4 is a plot that represents a disconnect clutch state versus time. The Y axis represents disconnect clutch state. The disconnect clutch state is closed when the disconnect clutch state trace is at a higher level. The disconnect clutch state is open when the disconnect clutch state trace is at a lower level. Trace 402 represents disconnect clutch state for a first strategy. Trace 404 represents disconnect clutch state for a second strategy. Trace 404 follows trace 402 when trace 404 is not visible.

At time $T_5$, the engine is running as indicated by the engine start/run request being at a higher state. The engine and DISG are operating at different speeds and the disconnect clutch is open so as to mechanically decouple the engine and the DISG. The engine may be at an idle speed for example while the DISG speed is higher than the engine idle speed. The driveline may operate in this state to reduce engine fuel consumption while providing a short response time for large engine torque changes. The DISG is providing a middle level of torque to the vehicle driveline and the engine is providing a low level of torque to rotate the engine at idle speed. The DMF is not transferring torque since the disconnect clutch is in an open state.

At time $T_6$, the engine start/run request transitions to a low state in response to a request to stop the engine. The engine may be stopped automatically without input by a driver to a device that has a sole function of starting/stopping an engine (e.g., an ignition switch). Alternatively, the engine stop request or a change in state of the engine start/run request may be made via a driver input. The DISG speed is reduced to the speed of the engine in response to the change in state of the engine start/run request. The DISG torque is also reduced in response to the change of state in the engine start/run request. Engine speed and torque continue at their respective values.

Between time $T_6$ and time $T_7$, the DISG speed and the engine speed are substantially equal (e.g., ±50 RPM). The disconnect clutch is closed in response to DISG and engine speed being substantially equal. The torque transferred across the DMF increases a small amount as the disconnect clutch is closed.

At time $T_7$, at least one of spark and fuel flow to the engine are stopped in response to the disconnect clutch closing. The DISG output torque is also decreased in response to the disconnect clutch closing. Consequently, the engine torque begins to decrease and the engine speed and DISG speed begin to decrease. The engine start/run request remains in a low state.

Between time $T_7$ and time $T_8$, the DISG speed and torque are adjusted so that engine speed follows a desired predetermined profile. DISG speed and torque are also adjusted in response to engine position as the engine and DISG decelerate to a stop. Adjusting DISG torque during engine stopping may cause torque oscillations across the DMF as shown. Therefore, the DISG torque is adjusted to cancel out the DMF oscillations. For example, if the springs in the DMF release energy to the driveline, the DISG applies a torque equal and opposite to the torque that the DMF applies to the driveline. In this way, driveline oscillations during engine stopping may be reduced. The disconnect clutch remains engaged as the engine and DISG decelerate.

At time $T_8$, the engine stops. In this example, a small adjustment is made to engine position by rotating the DISG in a reverse direction from the direction the engine turns while running. The reverse direction is indicated by the DISG and engine speeds falling below their respective X axis. If the engine stops in the exact desired position, reverse engine rotation may not be performed. The disconnect clutch may remain engaged during the engine stop, or alternatively, the disconnect clutch may be opened after engine stop as indicated by trace 404 transitioning to a lower level.

Figure 5:
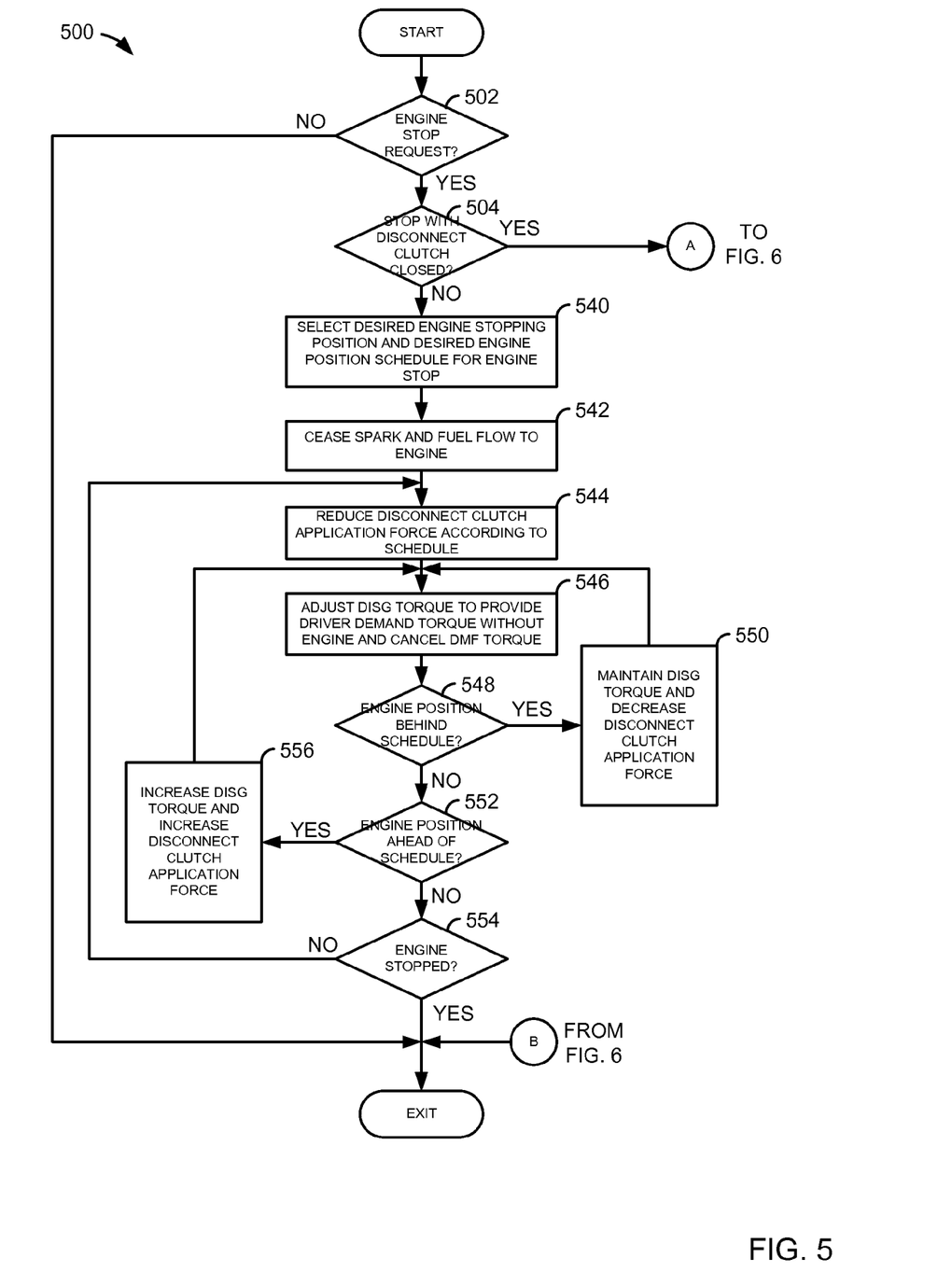
FIGS. 5 and 6 show an example method for stopping an engine.
Figure 6:
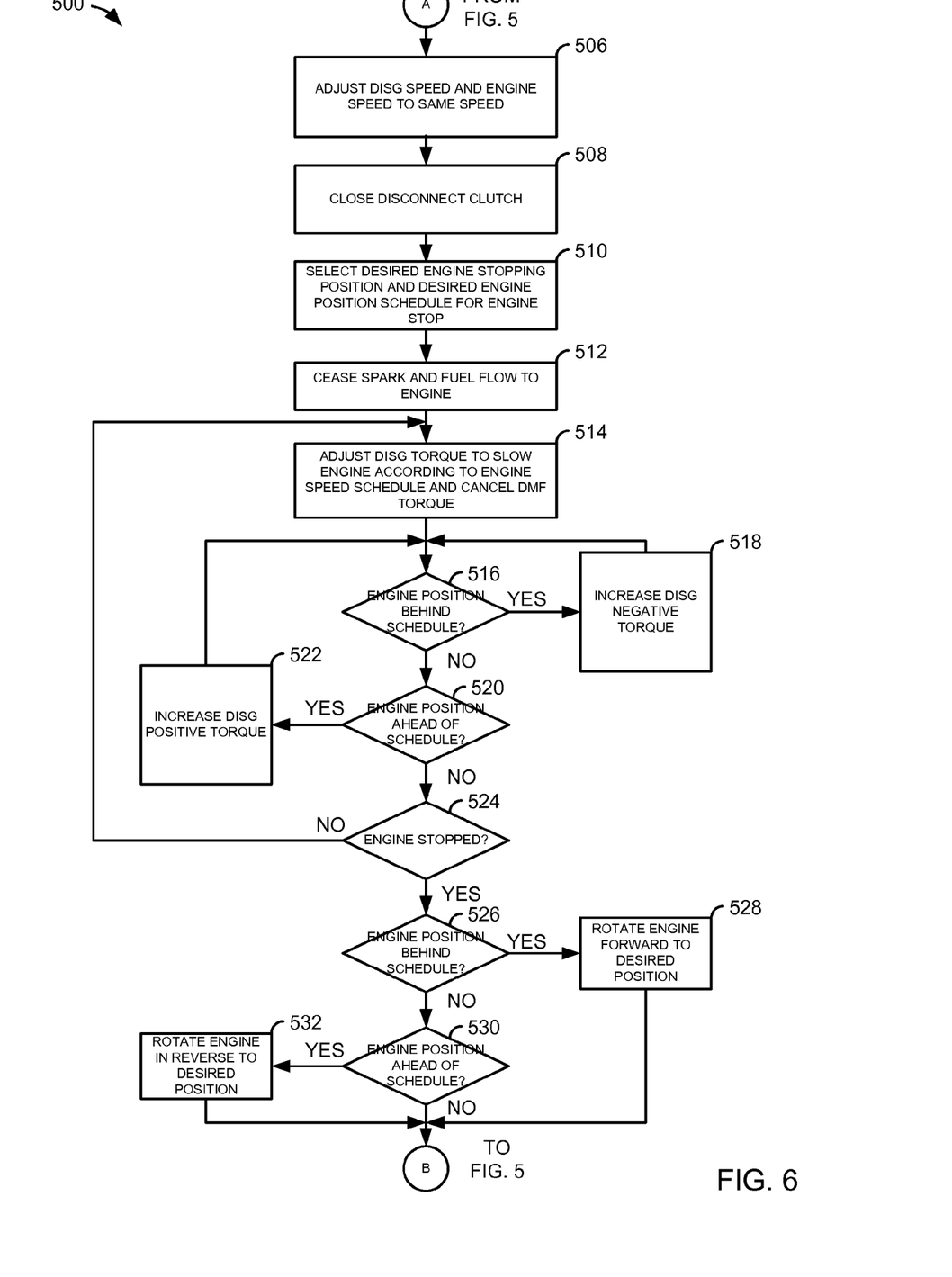

Referring now to FIGS. 5 and 6, an example method for stopping an engine is shown. The method of FIGS. 5 and 6 may be stored as executable instructions in non-transitory memory in the system of FIGS. 1 and 2. Further, the method of FIGS. 5 and 6 may provide the sequences shown in FIGS. 3 and 4.

At 502, method 500 judges whether or not an engine stop request is present. An engine stop request may be provided via a controller or a driver. If method 500 judges that an engine stop request is present, method 500 proceeds to 504. Otherwise, method 500 proceeds to exit.

At 504, method 500 judges whether or not the engine is to be stopped with the disconnect clutch in a closed state. In one example, the engine may be stopped with the disconnect clutch in a closed state when a driver initiates an engine stop. The engine may be stopped with an open disconnect clutch when a controller automatically requests an engine stop without a driver's direct input to a dedicated input that has a sole purpose of starting/stopping the engine. If method 500 judges to stop the engine with the disconnect clutch in a closed state, method 500 proceeds to 506 in FIG. 6. Otherwise, method 500 stops the engine with the disconnect clutch in an open state and proceeds to 540.

At 506, method adjusts the DISG speed and the engine speed to a same speed in response to the engine stop request. In some examples, the DISG speed may be adjusted to the present engine speed. In other examples, the engine may be adjusted to the DISG speed. In still other examples, the DISG and engine may be adjusted to a predetermined speed. If the disconnect clutch is closed at the time of the engine stop request, no initial adjustment in engine or DISG speed may be made. Method 500 proceeds to 508 after engine and/or DISG speed may be adjusted.

At 508, method 500 closes the disconnect clutch in response to the engine stop request. The disconnect clutch may be electrically or hydraulically closed. Method 500 proceeds to 510 after the disconnect clutch is closed.

At 510, method 500 selects a desired engine stopping position and a desired engine speed deceleration profile or schedule for engine stopping. The desired engine stopping position and desired engine speed deceleration profile may be empirically determined and stored in functions or tables in controller memory. In one example, the desired engine stopping position is a crankshaft position where a selected cylinder is in a compression stroke or an expansion stroke. Method 500 proceeds to 512 after the desired engine stopping position and deceleration schedule are selected.

At 512, method 500 ceases at least one of spark and fuel flow to the engine. Stopping fuel and/or spark delivery to the engine causes combustion to cease and the engine begins to decelerate. Method 500 proceeds to 514 after spark and/or fuel flow to the engine cease.

At 514, method 500 adjusts DISG torque to slow the engine according to the engine speed schedule from 512. DISG torque may be adjusted according to a predetermined schedule stored in controller memory as well as from engine speed and position feedback. Additionally, the DISG torque is adjusted to cancel DMF torque oscillations that may be caused by springs and masses in the DMF. For example, if DMF releases torque to the driveline, DISG negative torque is increased. If the DMF absorbs torque from the driveline, DISG positive torque is increased. In this way, the DMF torque oscillations may be cancelled. Method 500 proceeds to 516 after the DISG torque is adjusted.

At 516, method 500 judges whether the present engine position and/or speed are lagging behind a desired engine speed and/or position schedule. Method 500 may determine that engine speed is lagging behind a desired engine speed schedule when actual engine speed is greater than the desired engine speed schedule. If method 500 judges that present engine speed is lagging behind the desired engine speed schedule, method 500 proceeds to 518. Otherwise, method 500 proceeds to 520.

At 518, method 500 increases a negative torque of the DISG to increase the rate that the engine is slowed to stop. In one example, the DISG negative torque is increased in response to a difference between the desired engine speed and the actual engine speed. Method 500 returns to 516 after DISG torque is adjusted.

At 520, method 500 judges whether the present engine position and/or speed are leading a desired engine speed and/or position schedule. Method 500 may determine that engine speed is leading a desired engine speed schedule when actual engine speed is less than the desired engine speed schedule. If method 500 judges that present engine speed leads the desired engine speed schedule, method 500 proceeds to 522. Otherwise, method 500 proceeds to 524.

At 522, method 500 increases a positive torque of the DISG to decrease the rate that the engine is slowed to stop. In one example, the DISG positive torque is increased in response to a difference between the desired engine speed and the actual engine speed. Method 500 returns to 516 after DISG torque is adjusted.

At 524, method 500 judges whether or not the engine is stopped. If the engine is stopped, method 500 proceeds to 526. Otherwise, method 500 returns to 514. In this way, engine speed during engine stopping is adjusted to follow a desired engine speed and/or position schedule.

At 526, method 500 judges whether the engine stop position is behind (e.g., 10 crankshaft degrees before the desired engine stop position) desired engine stop position. If the engine stop position is behind the desired engine stop position, method 400 proceeds to 528. Otherwise, method 500 proceeds to 530.

At 528, method 500 rotates the engine forward to the desired position. The engine is rotated via the DISG. Method 500 proceeds to exit via path B as indicated at FIG. 5. However, in some examples, the disconnect clutch may be adjusted to an open state after engine position is at the desired engine position.

At 530, method 500 judges whether the engine stop position is ahead (e.g., 10 crankshaft degrees after the desired engine stop position) desired engine stop position. If the engine stop position is ahead of the desired engine stop position, method 400 proceeds to 532. Otherwise, method 500 proceeds to exit via path B as indicated at FIG. 5. The disconnect clutch may remain closed or may be adjusted to an open state upon exit.

At 532, method 500 rotates the engine in a reverse direction as compared to when the engine was running to the desired position. The engine is rotated via the DISG. Method 500 proceeds to exit via path B as indicated at FIG. 5. The disconnect clutch may remain closed or may be adjusted to an open state upon exit.

At 540, method 500 selects a desired engine stopping position and a desired engine speed deceleration profile or schedule for engine stopping. The desired engine stopping position and desired engine speed deceleration profile may be empirically determined and stored in functions or tables in controller memory. In one example, the desired engine stopping position is a crankshaft position where a selected cylinder is in a compression stroke or an expansion stroke. Method 500 proceeds to 542 after the desired engine stopping position and deceleration schedule are selected.

At 542, method 500 ceases at least one of spark and fuel flow to the engine. Stopping fuel and/or spark delivery to the engine causes combustion to cease and the engine begins to decelerate. Method 500 proceeds to 544 after spark and/or fuel flow to the engine cease.

At 544, method 500 reduces the disconnect clutch application force according to a predetermined schedule. The predetermined schedule may be empirically determined and stored in functions and/or table in controller memory. Method 500 proceeds to 546 after the disconnect clutch pressure is reduced.

At 546, method 500 adjusts DISG torque to provide a desired driver demand torque. The DISG torque is adjusted to provide the desired driver demand torque without assistance from engine torque since the disconnect clutch is being opened. Further, the DISG torque is adjusted to cancel torque oscillations from the DMF that may enter the driveline via the slipping disconnect clutch. The DISG torque cancels the DMF torque as previously described. Method 500 proceeds to 548 after the DISG torque is adjusted.

At 548, method 500 judges whether the present engine position and/or speed are lagging behind a desired engine speed and/or position schedule. Method 500 may determine that engine speed is lagging behind a desired engine speed schedule when actual engine speed is greater than the desired engine speed schedule. If method 500 judges that present engine speed is lagging behind the desired engine speed schedule, method 500 proceeds to 550. Otherwise, method 500 proceeds to 552.

At 550, method 500 maintains the DISG torque and decreases the disconnect clutch application force so that less torque may be transferred from the DISG to the engine. In one example, the disconnect clutch force is decreased in response to a difference between the desired engine speed and the actual engine speed. Method 500 returns to 546 after disconnect clutch application force is adjusted.

At 552, method 500 judges whether the present engine position and/or speed are leading a desired engine speed and/or position schedule. Method 500 may determine that engine speed is leading a desired engine speed schedule when actual engine speed is less than the desired engine speed schedule. If method 500 judges that present engine speed leads the desired engine speed schedule, method 500 proceeds to 556. Otherwise, method 500 proceeds to 550.

At 556, method 500 increases a positive torque of the DISG to decrease the rate that the engine is slowed to stop. Further, the disconnect clutch application force is increase. Consequently, torque is transferred from the DISG to accelerate the engine. Increasing the DISG torque allows the DISG to remain at its present desired speed when torque supplied by the DISG to the engine is increased. Method 500 returns to 546 after DISG torque is adjusted.

At 554, method 500 judges whether or not the engine is stopped. If the engine is stopped, method 500 proceeds to exit. Otherwise, method 500 returns to 544. The disconnect clutch is adjusted to an open state by the time method 500 exits. In this way, engine speed during engine stopping is adjusted to follow a desired engine speed and/or position schedule while the disconnect clutch is being opened.

Thus, the method of FIGS. 5 and 6 provides for stopping an engine, comprising: adjusting a disconnect clutch application force in response to an engine stop request, and further adjusting the disconnect clutch slip to stop the engine at a desired position. The method further comprises substantially maintaining speed (e.g., ±150 RPM) of a driveline integrated starter/generator while adjusting the disconnect clutch application force. In some examples, the method further comprises adjusting a driveline integrated starter/generator torque output in response to an amount of torque transferred across a dual mass flywheel.

In one example, the method includes where adjusting the driveline integrated starter/generator torque output includes decreasing integrated starter/generator torque output when a driveline integrated starter/generator spring decompresses. The method includes where adjusting the driveline integrated starter/generator torque output includes increasing integrated starter/generator torque output when a driveline integrated starter/generator spring compresses. The method also includes where adjusting the driveline integrated starter/generator torque output includes cancelling torque disturbances from the dual mass flywheel. The method further comprises ceasing spark and fuel delivery to the engine in response to the engine stop request. The method includes where the disconnect clutch slip is adjusted according to a predetermined schedule.

In another example, the method of FIGS. 5 and 6 provides for stopping an engine, comprising: operating a DISG at a first speed; operating an engine at a second speed different than the first speed; adjusting the DISG and engine to a same speed in response to an engine stop request; and adjusting a disconnect clutch application force in response to the engine stop request. The method includes where the disconnect clutch application force is increased to close a disconnect clutch from an open position. The method further comprises stopping the engine and the DISG while the disconnect clutch is closed.

In another example, the method further comprises ceasing spark and fuel flow to the engine and adjusting DISG torque to stop the engine at a desired position. The method further comprises opening the disconnect clutch after engine stop. The method includes where adjusting DISG torque to stop the engine includes rotating the engine in a reverse direction. The method also further comprises adjusting DISG torque to cancel driveline torque oscillations from a dual mass flywheel.

As will be appreciated by one of ordinary skill in the art, methods described in FIGS. 5-6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for stopping an engine, comprising:
   adjusting a disconnect clutch application force in response to an engine stop request, and further adjusting a disconnect clutch slip to stop the engine at a desired position; and
   adjusting a driveline integrated starter/generator (DISG) torque output in response to an amount of torque transferred across a dual mass flywheel.

2. The method of claim 1, further comprising substantially maintaining speed of a DISG while adjusting the disconnect clutch application force.

3. The method of claim 1, where adjusting the DISG torque output includes decreasing integrated starter/generator torque output when a DISG spring decompresses.

4. The method of claim 1, where adjusting the DISG torque output includes increasing integrated starter/generator torque output when a DISG spring compresses.

5. The method of claim 1, where adjusting the DISG torque output includes cancelling torque disturbances from the dual mass flywheel.

6. The method of claim 1, further comprising ceasing spark and fuel delivery to the engine in response to the engine stop request.

7. The method of claim 1, where the disconnect clutch slip is adjusted according to a predetermined schedule.

8. A method for stopping an engine, comprising:
   operating a DISG at a first speed;
   operating the engine at a second speed different than the first speed;
   adjusting the DISG and engine to a same speed in response to an engine stop request;
   adjusting a disconnect clutch application force in response to the engine stop request, where the disconnect clutch application force is increased to close a disconnect clutch from an open position;
   stopping the engine and the DISG while the disconnect clutch is closed; and
   ceasing spark and fuel flow to the engine and adjusting DISG torque to stop the engine at a desired position, where adjusting DISG torque to stop the engine includes rotating the engine in a reverse direction.

9. The method of claim 8, further comprising opening the disconnect clutch after engine stop.

10. A method for stopping an engine, comprising:
    operating a DISG at a first speed;
    operating the engine at a second speed different than the first speed;
    adjusting the DISG and engine to a same speed in response to an engine stop request;
    adjusting a disconnect clutch application force in response to the engine stop request, further comprising adjusting DISG torque to cancel driveline torque oscillations from a dual mass flywheel.

11. The method of claim 10, where the disconnect clutch application force is increased to close a disconnect clutch from an open position.

12. The method of claim 11, further comprising stopping the engine and the DISG while the disconnect clutch is closed.

13. The method of claim 12, further comprising ceasing spark and fuel flow to the engine and adjusting DISG torque to stop the engine at a desired position.

14. The method of claim 13, further comprising opening the disconnect clutch after engine stop.

15. The method of claim 13, where adjusting DISG torque to stop the engine includes rotating the engine in a reverse direction.

* * * * *